United States Patent [19]
Liao et al.

[11] Patent Number: 6,136,908
[45] Date of Patent: Oct. 24, 2000

[54] PREPARATION OF THERMOPLASTIC NANOCOMPOSITE

[75] Inventors: Chien-Shiun Liao; Wen-Faa Kuo, both of Hsinchu; Li Kuei Lin, Hsinchu Hsien, all of Taiwan

[73] Assignee: Industrial Technology Research Institute, Hsinchu, Taiwan

[21] Appl. No.: 09/334,681

[22] Filed: Jun. 17, 1999

[51] Int. Cl.$^7$ ........................................ C08K 3/36
[52] U.S. Cl. .................. 524/445; 524/446; 524/447; 524/449; 524/442; 524/451; 524/401; 524/443; 525/432; 525/190; 523/216
[58] Field of Search .................... 524/445, 446, 524/447, 449, 442, 451, 401, 443; 525/432, 190; 523/216

[56] References Cited

U.S. PATENT DOCUMENTS

| | | | |
|---|---|---|---|
| 3,869,431 | 3/1975 | Spiewak | 528/367 |
| 5,385,776 | 1/1995 | Maxfield et al. | 428/297.4 |
| 5,414,042 | 5/1995 | Ysue et al. | 524/789 |
| 5,844,032 | 12/1998 | Serrano et al. | 524/445 |
| 5,866,645 | 2/1999 | Pinnavaia et al. | 524/443 |

OTHER PUBLICATIONS

L.j. Mathias et al., Journal of Polymer Science, Part A, Polymer Chemistry, vol. 25, 2699–2709, 1987.

Encyclopedia of Chemical Technology, 4th Ed., vol. 6, edited by Kroschwitz et al., John Wiley & Sons, p. 393, 1996.

*Primary Examiner*—Robert Dawson
*Assistant Examiner*—Kuo-Liang Peng
*Attorney, Agent, or Firm*—Sughrue, Mion, Zinn, Macpeak & Seas, PLLC

[57] ABSTRACT

A method for producing a thermoplastic nanocomposite is disclosed. The method comprises the steps of: (a) contacting a swellable layered silicate with a polymerizable aminoaryl lactam monomer to achieve intercalation of said lactam monomer between adjacent layers of said layered silicate; and (b) admixing the intercalated layered silicate with a thermoplastic polymer, and heating the admixture to provide for flow of said polymer and polymerization of the intercalated lactam monomer to cause exfoliation of said layered silicate, thereby forming a thermoplastic nanocomposite having exfoliated silicate layers dispersed in a thermoplastic polymer matrix.

12 Claims, 4 Drawing Sheets

PREPARATION OF THERMOPLASTIC NANOCOMPOSITE

BACKGROUND OF THE INVENTION

1. Field of the Invention

The present invention relates in general to a method for producing a thermoplastic nanocomposite comprising a polymer matrix having dispersed therein exfoliated silicate layers derived from a intercalated layered silicate. More particularly, this invention relates to such a process where the intercalated layered silicate is intercalated with a polymerizable lactam monomer, such that during the process the silicate layers are exfoliated due to polymerization of said monomer and dispersed in the polymer matrix to impart mechanical reinforcement.

2. Description of the Related Arts

Nanocomposites are a new class of materials which exhibit ultrafine phase dimensions, typically in the range 1–100 nm. Experimental work on these materials has generally shown that virtually all types and classes of nanocomposites lead to new and improved properties such as increased stiffness, strength, and heat resistance, and decreased moisture absorption, flammability, and permeability, when compared to their micro- and macro-composite counterparts.

In regard to preparation of thermoplastic nanocomposites, it has been disclosed that swelling agents such as long-chain organic cations, and water-soluble oligomers or polymers can be intercalated or absorbed between adjacent layers of a layered silicate, such as smectite clay, to thereby increase the interlayer spacing between the adjacent silicate layers, so that polymer chains can be included between the silicate layers when mixing the layered silicate with a polymer melt. See for example, U.S. Pat. No. 5,552,469, WO 93/04117, Japanese Laid Open Patent Application Nos. 8-151,449, 7-207,134, 7-228,762, 7-331,092, 8-259,806, and 8-259,846. However, the layered silicate according to these methods for the most part can not be exfoliated into individual layers (but can only be swollen) to impart greater mechanical reinforcement to the polymer matrix. To the contrary, the swelling agents sometimes precipitate out and decrease the mechanical properties of the composites.

SUMMARY OF THE INVENTION

It is therefore an object of the invention to provide a process for producing thermoplastic nanocomposites, by which silicate layers can be exfoliated and uniformly dispersed in a polymeric matrix to impart greater reinforcement.

To attain the above object, the present invention provides a novel method for producing thermoplastic, where the layered silicate is intercalated with a polymerizable lactam monomer, such that the silicate layers are exfoliated due to polymerization of said monomer and dispersed in the polymer matrix to impart mechanical reinforcement when admixed with a thermoplastic polymer melt.

The method according to the invention includes the steps of: (a) contacting a swellable layered silicate with a polymerizable N-aminoaryl substituted lactam monomer to achieve intercalation of said lactam monomer between adjacent layers of said layered silicate; and (b) admixing the intercalated layered silicate with a thermoplastic polymer, and heating the admixture to provide for flow of said polymer and polymerization of the intercalated lactam monomer to cause exfoliation of said layered silicate, thereby forming a thermoplastic nanocomposite having exfoliated silicate layers dispersed in a thermoplastic polymer matrix.

DETAILED DESCRIPTION OF THE INVENTION

The present method for nanocomposite preparation involves intercalation of a polymerizable lactam monomer between adjacent layers of a layered silicate, and compounding the intercalated layered silicate into molten polymers. The intercalated lactam monomer undergoes polycondensation to form a polyamide with stiff chains when admixing the intercalated layered silicate with a polymer melt (at a temperature not less than 200° C.), thereby expanding the interlayer spacing between the adjacent silicate layers, so that the layered silicate can be easily exfoliated into nanoscale platelets. More specifically, the polymerization of the lactam monomer results in a high-melting-point aromatic polyamide having a terminal group which is reactive with and therefore compatible with the polymer matrix of the composite. On one hand, the polyamide formed from the lactam monomer facilitates the exfoliation of the silicate layers, and on the other hand imparts mechanical reinforcement to the polymer matrix.

The polymerizable lactam polymer used in the present invention is an N-aminoaryl substituted lactam monomer, which can be prepared via a one-step synthesis by coupling an aromatic amino acid with a lactam having a cyclic ring system containing 1 to 12 carbon atoms. Illustrative example of such aminoaryl lactams are N-(p-aminobenzoyl) caprolactam, N-(p-aminobenzoyl)butyrolactam, N-(p-aminobenzoyl)valerolactam, and N-(p-aminobenzoyl) dodecanelactam.

The layered silicate suitable for used herein preferably has a cation-exchange capacity ranging from 50 to 200 meq/100 g. Typically the layered silicate can be a swellable clay material such as smectite clay, vermiculite, halloysite, or sericite; or a swellable mica-based mineral such as fluoromica. Illustrative of suitable smectite clays are montmorillonite, saponite, beidellite, nontronite, hectorite, and stevensite. The fluoro-mica used in the invention can be prepared by heating a mixture comprising 65–90 wt % of talc and 10–35 wt % of at least one of silicon fluoride, sodium fluoride, and lithium fluoride. In accordance with a preferred embodiment of the invention, the layered silicate is an amino acid-intercalated montmorillonite manufactured by Nanocor Company under the trade name of "Aminoclay". The nanocomposite according to the invention preferably comprises 0.05–80 wt %, more preferably 1–30 wt %, of the layered silicate as the inorganic component.

The method according to the invention are outstandingly suitable for thermoplastic polymers of all types, including crystalline polar polymers such as nylon 6, crystalline non-polar polymers such as polypropylene (PP), non-crystalline non-polar polymers such as polystyrene (PS), and non-crystalline polar polymers such as polycarbonate (PC).

Other objects, features, and advantages of the present invention will become apparent from the following detailed description which makes reference to the accompanying drawings.

EXAMPLE 1

Synthesis of Polymerizable Lactam Monomer

Figure 1:
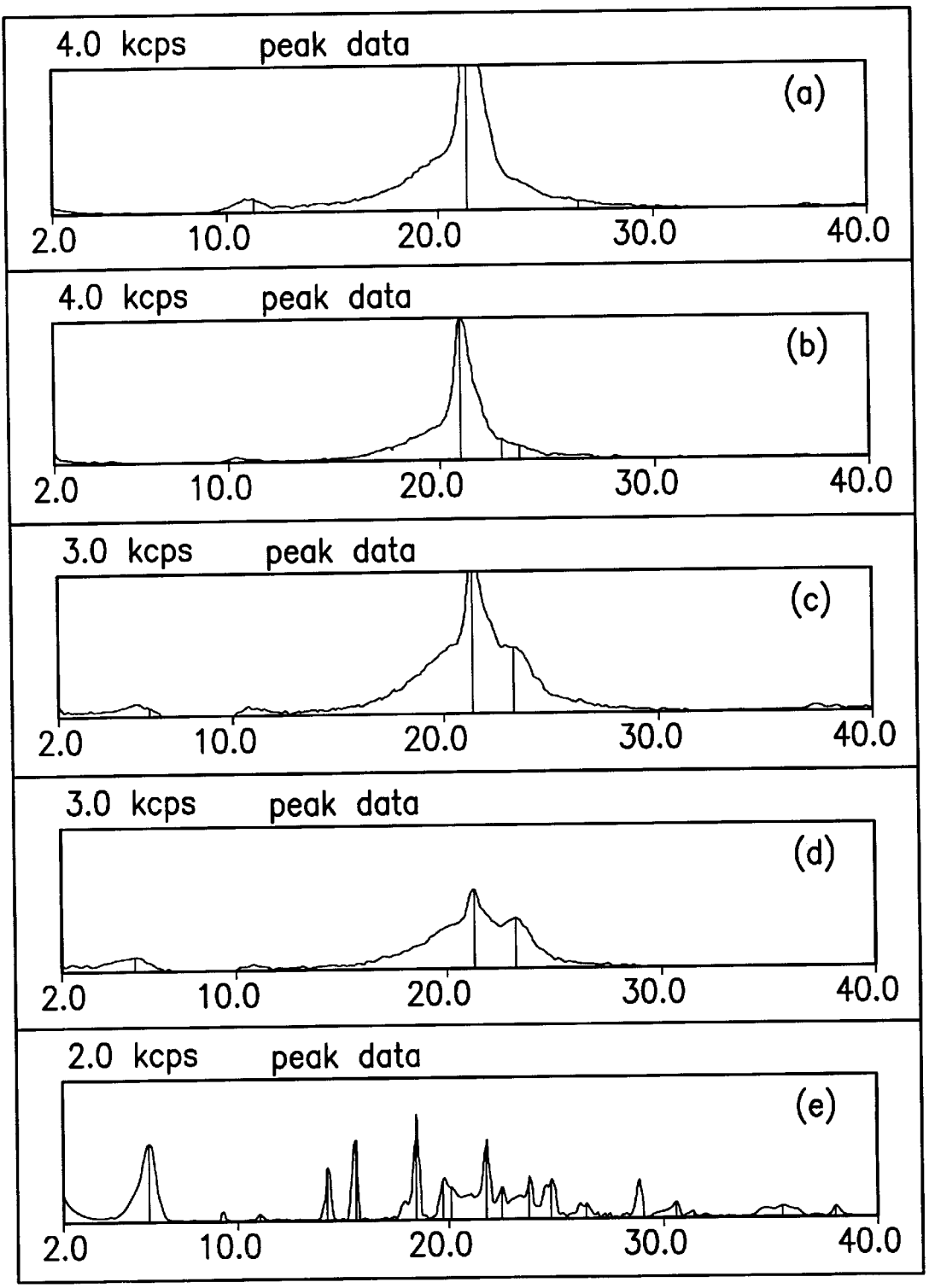
FIG. 1 illustrates X-ray diffraction profiles of Aminoclay/Nylon 6 composites containing (a) 1%, (b) 2%, (c) 5%, (d) 10% lactam-Aminoclay complex by weight, and (E) lactam-Aminocaly complex.

Into a 1000 mL round-bottom flask equipped with a condenser and a saturated NaOH solution trap were charged p-aminobenzoic acid (100 g, 0.703 mol) and thionyl chloride (385 mL, 5.370 mol). The reaction mixture was refluxed for 4 hours until a clear solution was obtained. After removal of the unreacted thionyl chloride by concentration, p-sulfinylaminobenzoyl chloride was distilled under reduced pressure.

Into a 3000 mL three-neck reactor were charged caprolactam (150 g, 0.703 mol), toluene (1300 mL), and pyridine (680 mL); the reactor was then purged with nitrogen. Under ice bath, p-sulfinylaminobenzoyl chloride (147.1 g, 0.730 mol) was added with stirring to the above mixture. After removing the ice-bath, the reaction mixture was stirred at room temperature for 14 hours. After this, pyridine chloride was removed by filtration and the filtrate was washed with 5% sodium bicarbonate solution two times, and then concentrated to remove the solvent. The residue was recrystallized from ethyl acetate to give N-(p-aminobenzoyl)caprolactam, a polymerizable lactam monomer.

Preparation of Thermoplastic Nanocomposite

Figure 2:
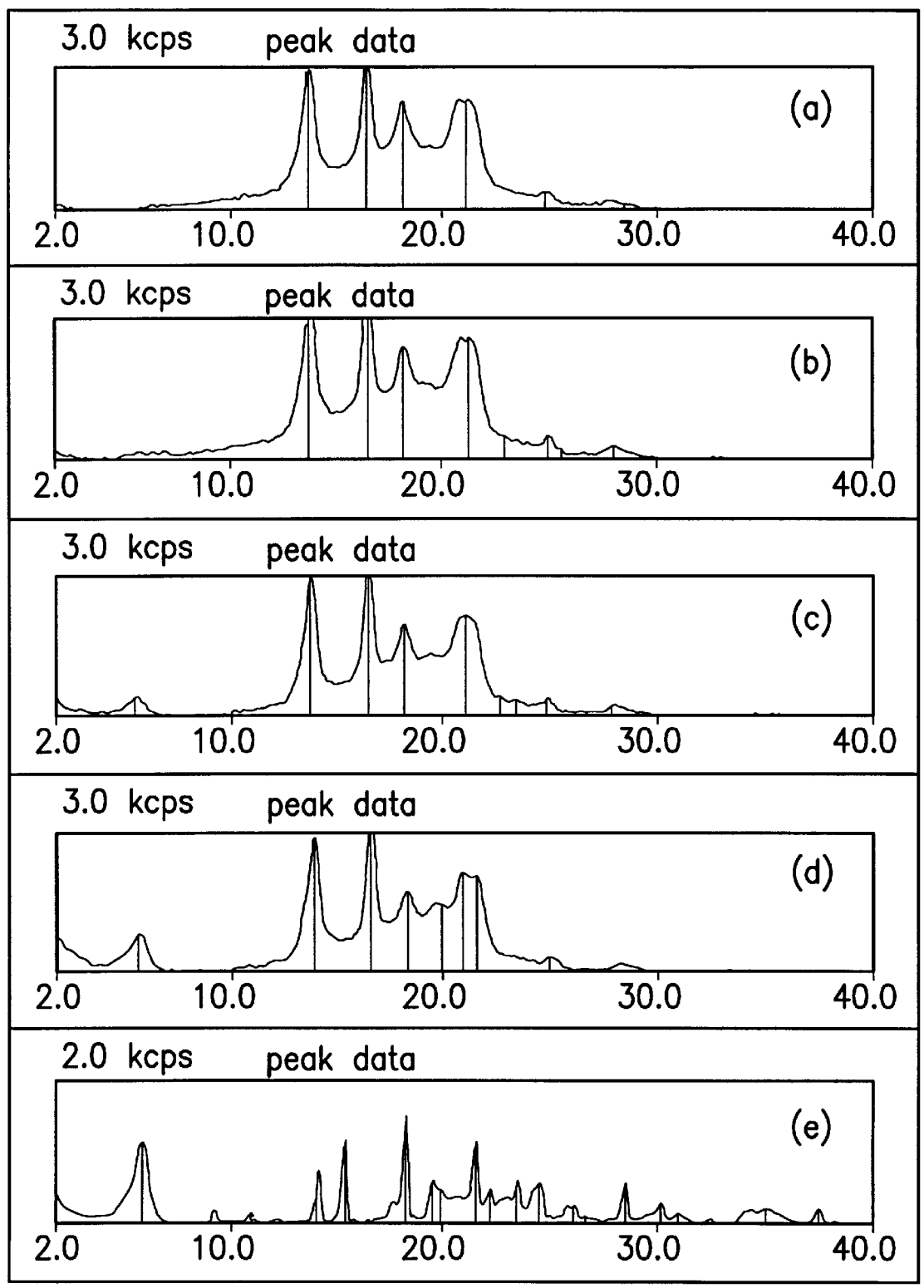
FIG. 2 illustrates X-ray diffraction profiles of Aminoclay/PP composites containing (a) 1%, (b) 2%, (c) 5%, (d) 10% lactam-Aminoclay complex by weight, and (E) lactam-Aminocaly complex.
Figure 3:
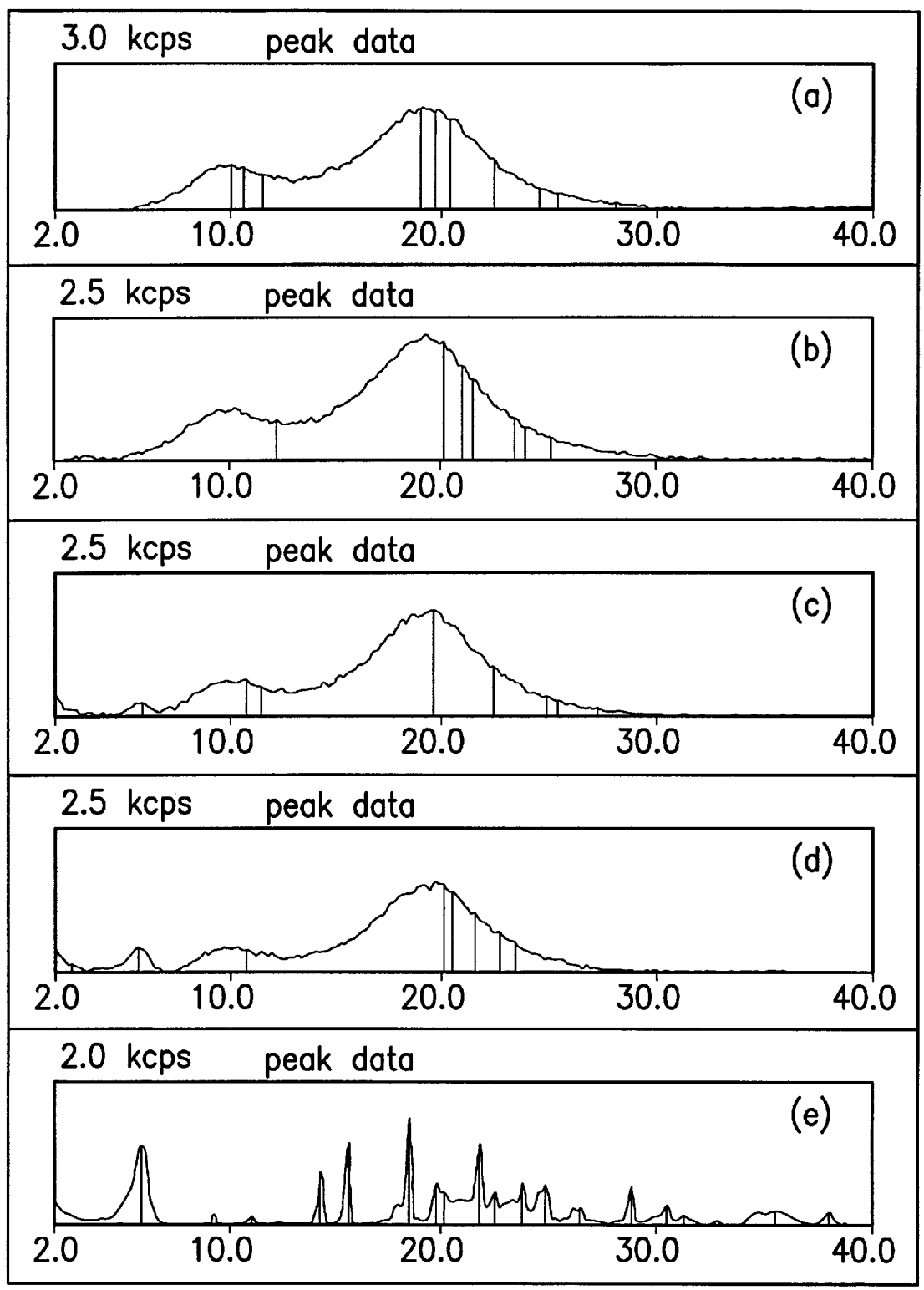
FIG. 3 illustrates X-ray diffraction profiles of Aminoclay/PS composites containing (a) 1%, (b) 2%, (c) 5%, (d) 10% lactam-Aminoclay complex by weight, and (E) lactam-Aminocaly.
Figure 4:
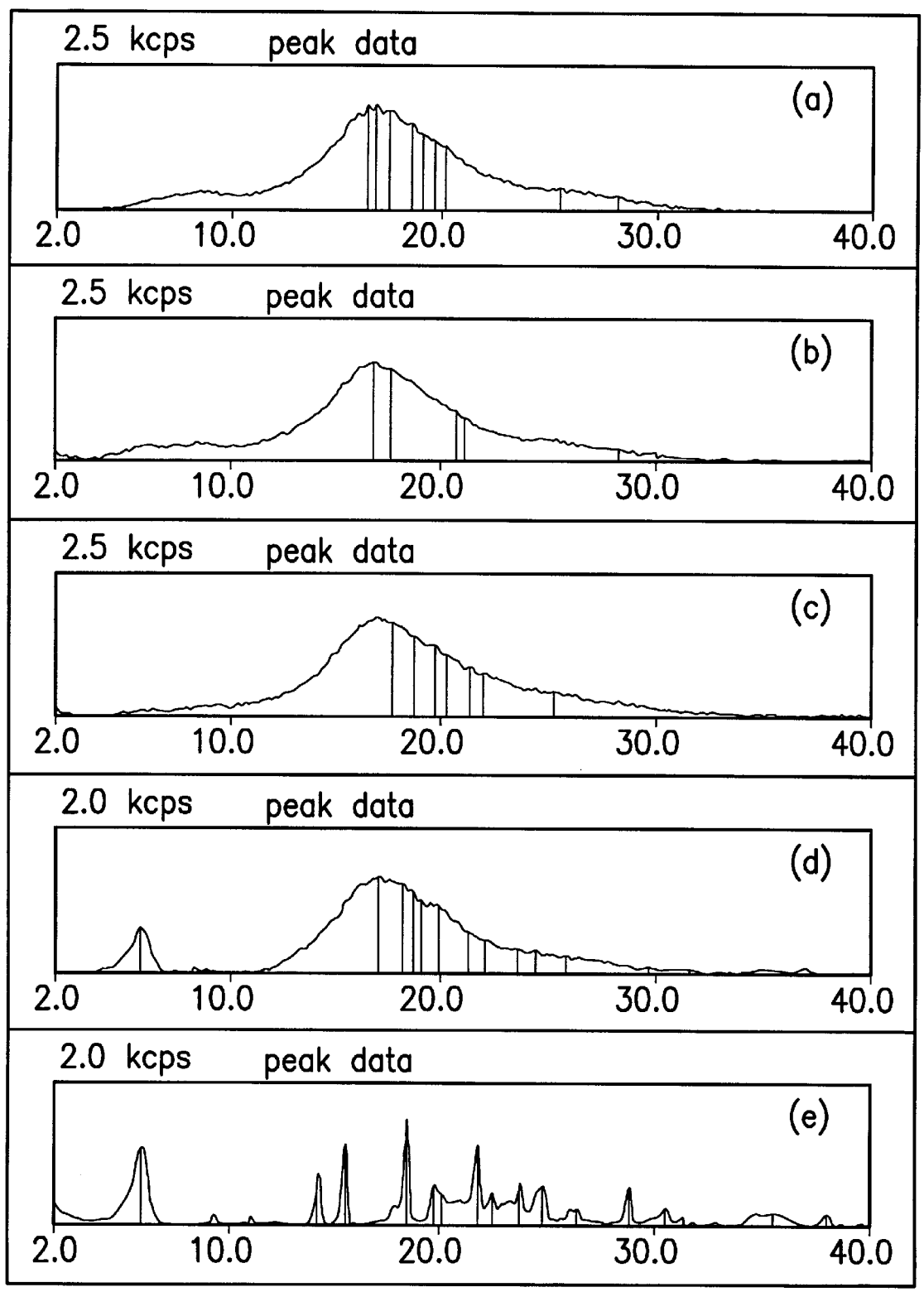
FIG. 4 illustrates X-ray diffraction profiles of Aminoclay/PC composites containing (a) 1%, (b) 2%, (c) 5%, (d) 10% lactam-Aminoclay complex by weight, and (E) lactam-Aminocaly complex.

N-(p-aminobenzoyl)caprolactam and "Aminoclay" (montmorillonite intercalated with 12-aminolauric acid, made by Nanocor Company), were added to a flask containing pyridine at a weight ratio of 1:1, and then (dimethylamino)pyridine (DMAP, 0.58 phr) was added as an ion-exchange catalyst, followed by thorough mixing. After evaporation of pyridine in vacuum, a complex of lactam-intercalated Aminoclay was produced. In a barbender the lactam-Aminoclay complex was admixed with Nylon 6, PP, PS, and PC, respectively, to give four series of thermoplastic composites with the lactam-Aminoclay complex being present in amounts of (a) 1, (b) 2, (c) 5, and (d) 10% by weight of the composites. The composites thus-obtained were processed into films by hot pressing, and analyzed using the X-ray diffraction method with results being shown in FIGS. 1–4. For all of the composites containing 1 or 2 wt % of the lactam-Aminoclay complex, and for PC composites containing 5 wt % of the same, the absence of diffraction peaks between 2°–10° (2θ), as shown in FIGS. 1–4(a)–(b) and FIG. 4(c), clearly indicates exfoliation of the layered silicate took place. According to the results, thermoplastic nanocomposites having exfoliated silicate layers dispersed therein were obtained by admixing the lactam monomer-layered silicate complex with thermoplastic polymer melts.

While the invention has been particularly shown and described with the reference to the preferred embodiment thereof, it will be understood by those skilled in the art that various changes in form and details may be made without departing from the spirit and scope of the invention.

What is claimed is:

1. A method for producing a thermoplastic nanocomposite, comprising the steps of:

contacting a swellable layered silicate with a polymerizable N-aminoaryl substituted lactam monomer to achieve intercalation of said lactam monomer between adjacent layers of said layered silicate; and admixing the intercalated layered silicate with a thermoplastic polymer, and heating the admixture to provide for flow of said polymer and polymerization of the intercalated lactam monomer to cause exfoliation of the layered silicate, thereby forming a thermoplastic nanocomposite having exfoliated silicate layers dispersed in a thermoplastic polymer matrix.

2. The method as claimed in claim 1, wherein said aminoaryl lactam is prepared by coupling an aromatic amino acid with a lactam.

3. The method as claimed in claim 2, wherein the lactam moiety of said aminoaryl lactam has a cyclic ring system containing 1 to 12 carbon atoms.

4. The method as claimed in claim 3, wherein said aminoaryl lactam is N-(p-aminobenzoyl)caprolactam.

5. The method as claimed in claim 1, wherein said layered silicate has a cation-exchange capacity ranging from 50 to 200 meq/100 g.

6. The method as claimed in claim 1, wherein said nanocomposite comprises 0.05–80 wt % of said layered silicate.

7. The method as claimed in claim 1, wherein said layered silicate is selected from the group consisting of smectite clay, vermiculite, halloysite, or sericite.

8. The method as claimed in claim 7, wherein said smectite clay is selected from the group consisting of montmorillonite, saponite, beidellite, nontronite, hectorite, and stevensite.

9. The method as claimed in claim 1, wherein said layered silicate is montmorillonite intercalated with an amino acid before being intercalated with said N-aminoaryl substituted caprolactam.

10. The method as claimed in claim 1, wherein said layered silicate is fluoro-mica.

11. The method as claimed in claim 10, wherein said fluoro-mica is prepared by heating a mixture comprising 65–90 wt % of talc and 10–35 wt % of at least one of silicon fluoride, sodium fluoride, and lithium fluoride.

12. The method as claimed in claim 10, wherein said thermoplastic polymer is selected from group consisting of crystalline polar thermoplastic polymers, crystalline nonpolar thermoplastic polymers, non-crystalline non-polar thermoplastic polymers, and non-crystalline polar thermoplastic polymers.

* * * * *